United States Patent
Seo et al.

(10) Patent No.: US 8,880,971 B2
(45) Date of Patent: Nov. 4, 2014

(54) COOPERATIVE H-ARQ SUPPORTING METHOD

(75) Inventors: Bangwon Seo, Daejeon (KR); Heesoo Lee, Daejeon (KR); Hyun Kyu Chung, Daejeon (KR); Yun Hee Kim, Yongin-si (KR); Sung Kyo Kang, Seoul (KR)

(73) Assignee: Industry Academy Cooperation Foundation of Kyunghee University, Gyeonggi-Do (KR)

( * ) Notice: Subject to any disclaimer, the term of this patent is extended or adjusted under 35 U.S.C. 154(b) by 1041 days.

(21) Appl. No.: 12/528,404

(22) PCT Filed: Oct. 26, 2007

(86) PCT No.: PCT/KR2007/005315
§ 371 (c)(1),
(2), (4) Date: Aug. 24, 2009

(87) PCT Pub. No.: WO2008/108527
PCT Pub. Date: Sep. 12, 2008

(65) Prior Publication Data
US 2010/0115363 A1 May 6, 2010

(30) Foreign Application Priority Data
Mar. 6, 2007 (KR) .................. 10-2007-0021857

(51) Int. Cl.
*H04L 1/18* (2006.01)
*H04L 1/14* (2006.01)
*G08C 25/02* (2006.01)
*H04L 1/00* (2006.01)

(52) U.S. Cl.
CPC ............ *H04L 1/1812* (2013.01); *H04L 1/1816* (2013.01); *H04L 1/1825* (2013.01); *H04L 1/1845* (2013.01); *H04L 2001/0097* (2013.01)
USPC .............................. 714/748; 714/750; 714/751

(58) Field of Classification Search
CPC ............................ H04L 1/1812; H04L 1/1816
USPC ............. 71/748, 750, 751; 714/748, 750, 751
See application file for complete search history.

(56) References Cited

U.S. PATENT DOCUMENTS 4,638,298 A * 1/1987 Spiro ........................... 370/392
5,247,380 A * 9/1993 Lee et al. ...................... 398/118
(Continued)

FOREIGN PATENT DOCUMENTS

JP           05/268997       9/2005
KR        1020060134058    12/2006
(Continued)

OTHER PUBLICATIONS

Agustin, Adrian et al., "Evaluation of Turbo H-ARQ Schemes for Cooperative MIMO Transmission," 2004 *International Workshop on Wireless Ad-Hoc Networks*, pp. 20-24 (2004).

(Continued)

*Primary Examiner* — Joseph D Torres
(74) *Attorney, Agent, or Firm* — Nelson Mullins Riley & Scarborough LLP

(57) ABSTRACT

In the hybrid automatic repeat request (H-ARQ) supporting method for cooperative transmission, a receiver selects one H-ARQ repeat method from among the chase combining method and the incremental redundancy method according to the SNR when the data packet cooperatively transmitted by transmitters generates an error. Also, the method for the receiver to select a repeat transmitter includes a method for selecting a repeat transmitter in advance, a method for removing a transmitting node from a repeat transmitter group when the SNR of the transmitting node is low, and a method for estimating the SNR of each transmitter for each predetermined time frame and selecting the transmitter having the greatest SNR as the repeat transmitter.

6 Claims, 13 Drawing Sheets

(56) References Cited

U.S. PATENT DOCUMENTS

| | | | |
|---|---|---|---|
| 5,699,367 A * | 12/1997 | Haartsen | 714/749 |
| 5,815,667 A * | 9/1998 | Chien et al. | 709/232 |
| 6,977,888 B1 | 12/2005 | Frenger et al. | |
| 7,007,218 B2 | 2/2006 | Chamberlain | |
| 7,065,068 B2 | 6/2006 | Ghosh et al. | |
| 7,137,047 B2 | 11/2006 | Mitlin et al. | |
| 7,155,655 B2 * | 12/2006 | Cheng | 714/748 |
| 7,218,891 B2 * | 5/2007 | Periyalwar et al. | 455/13.1 |
| 7,269,147 B2 * | 9/2007 | Kim et al. | 370/312 |
| 7,447,148 B2 * | 11/2008 | Gao et al. | 370/216 |
| 7,823,040 B2 * | 10/2010 | Cheng | 714/751 |
| 7,839,858 B2 * | 11/2010 | Wiemann et al. | 370/394 |
| 7,864,799 B2 * | 1/2011 | Sachs | 370/466 |
| 7,924,761 B1 * | 4/2011 | Stevens | 370/315 |
| 7,929,988 B2 * | 4/2011 | Horiuchi et al. | 455/550.1 |
| 8,149,757 B2 * | 4/2012 | Zheng et al. | 370/315 |

FOREIGN PATENT DOCUMENTS

| | | | | |
|---|---|---|---|---|
| WO | WO-2005/078976 A1 | 8/2005 | | |
| WO | WO 2006024321 A1 * | 3/2006 | | H04J 3/16 |
| WO | WO-2008/108527 A1 | 9/2008 | | |

OTHER PUBLICATIONS

Janani, Mohammad et al., "Coded Cooperation in Wireless Communications: Space-Time Transmission and Iterative Decoding," *IEEE Transactions on Signal Processing*, vol. 52(2):362-371 (2004).

Kang, Sung Kyo et al., "Adaptive User Cooperation with HARQ for the Uplink of a Turbo-coded System," 2007 *IEEE 65th Vehicular Technology Conference*, (2007).

International Search Report and Written Opinion for Application No. PCT/KR2007/005315, dated Feb. 5, 2008.

* cited by examiner

COOPERATIVE H-ARQ SUPPORTING METHOD

RELATED APPLICATIONS

This application is a 35 U.S.C. §371 national stage filing of PCT Application No. PCT/KR2007/005315 filed on Oct. 26, 2007, which claims priority to, and the benefit of, Korean Patent Application No. 10-2007-0021857 filed on Mar. 6, 2007. The contents of the aforementioned applications are hereby incorporated by reference.

BACKGROUND OF THE INVENTION

1. Field of the Invention

The present invention relates to a cooperative repeat method by a plurality of transmitters in a wireless communication system. More particularly, the present invention relates to a hybrid automatic repeat request (H-ARQ) supporting method for cooperative transmission in a wireless communication system.

This work supported by the IT R&D program of MIC/IITA [2006-S-001-01, Development of Adaptive Radio Access and Transmission Technologies for $4^{th}$ Generation Mobile Communications].

2. Description of the Related Art

Recently, various cooperative transmission methods have been researched so as to improve transmission quality and widen transmission distances by using diversity of radio fading channels. The cooperative transmission methods represent the method for a transmitter as a transmission node to transmit signals in cooperation with another relay as a relay node, which is a generalized concept of a relay.

Regarding the cooperative transmission methods, the conventional art discloses a coding cooperative transmission method for improving channel coding diversity. In the coding cooperative transmission method, a transmitter as a transmission node transmits channel coded data to the transmitter as a relay node when transmitting data to a receiver, thereby performing cooperative transmission with the relay node.

The method for correcting the errors when at least two transmitters transmit data in cooperation with each other is to be performed differing from the existing one by one method in which a transmitter transmits the data.

The conventional one by one method uses the H-ARQ method so as to correct the errors. In the H-ARQ method, when a transmitter transmits data packets, a receiver decodes the received packets and requests a repeat transmission of the corresponding data packet from the transmitter when the restored information data have errors. In this instance, the receiver stores the received packet having errors, combines the data packet repeated by the transmitter and the stored packet to perform a channel decoding process, and thereby reduces decoding errors and the number of repeating times. Among the H-ARQ methods, the method for repeating the same packet as the data packet of first transmission is called the chase combining (CC) method, and the method for transmitting a data packet that is different from the data packet of the first transmission and that has additional parity bits for information data is called the incremental redundancy (IR) method.

However, the existing H-ARQ method is applied to a single transmitter, and it increases power consumption of the transmitter when it is applied to the cooperative transmission method. Also, a transmitter distant from the receiver has a low signal-to-noise ratio (SNR) so that it has a low success rate of data packet transmission even though the H-ARQ is applied.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a hybrid automatic repeat request (H-ARQ) supporting method when pluralities of transmitters cooperatively transmit information data.

In one aspect of the present invention, a hybrid automatic repeat request (H-ARQ) supporting method for a receiver to receive a data packet from a cooperative group including a first transmitter for transmitting information data and at least one second transmitter for performing cooperative transmission with the first transmitter includes: receiving a data packet from at least one of the transmitters included in the cooperative group and determining a transmission error; selecting a repeat transmitter group including at least one of the transmitters included in the cooperative group when a transmission error is found; and transmitting a repeat request caused by the transmission error and response information corresponding to the repeat transmitter group to the cooperative group.

In another aspect of the present invention, a hybrid automatic repeat request (H-ARQ) supporting method by a transmitting node when the transmitting node transmits information data to a receiver in cooperation with at least one relay node includes: transmitting a first data packet corresponding to the information data to the receiver and the relay node; receiving response information corresponding to the first data packet from the receiver; and transmitting a second data packet corresponding to the information data to the receiver when the response information corresponds to a repeat request caused by transmission failure and the transmitting node is included in a repeat transmitter group corresponding to the response information.

In another aspect of the present invention, a hybrid automatic repeat request (H-ARQ) supporting method by a relay node when the transmitting node transmits information data to a receiver in cooperation with at least one relay node includes: receiving a first data packet corresponding to the information data from the transmitting node; restoring the information data from the first data packet, and determining an erroneous state of the restored information data; receiving response information corresponding to the information data from the receiver when the restored information data have no error; and transmitting a second data packet corresponding to the information data to the receiver when the response information corresponds to a repeat request caused by transmission failure and the relay node is included in a repeat transmitter group corresponding to the response information.

DETAILED DESCRIPTION OF THE EMBODIMENTS

Figure 1:
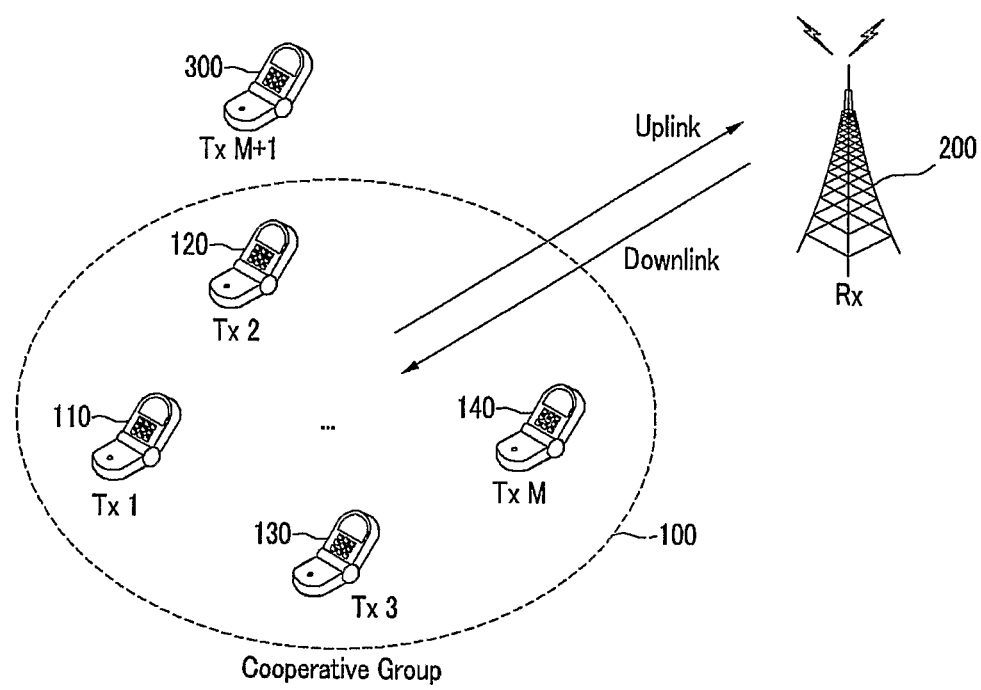
FIG. 1 shows a cooperative transmission system in a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising", and variations such as "comprises", will be understood to imply the inclusion of stated elements but not the exclusion of any other elements.

A hybrid automatic repeat request (H-ARQ) supporting method for cooperative transmission in a wireless communication system according to an exemplary embodiment of the present invention will now be described with reference to the accompanying drawings.

FIG. 1 shows a cooperative transmission system in a wireless communication system according to an exemplary embodiment of the present invention, illustrating a system in which a plurality of transmitters 110, 120, 130, and 140 cooperatively transmit data to a receiver 200.

In this instance, the receiver 200 can be a base station of the wireless communication system, and the transmitter can be a terminal or a mobile station. Also, a communication path for the transmitter to transmit the data packet to the receiver 200 is called an uplink (or a reverse link), and a communication path for the receiver 200 to transmit a receipt response and control information to the transmitter is called a downlink (or a forward link).

Figure 2:
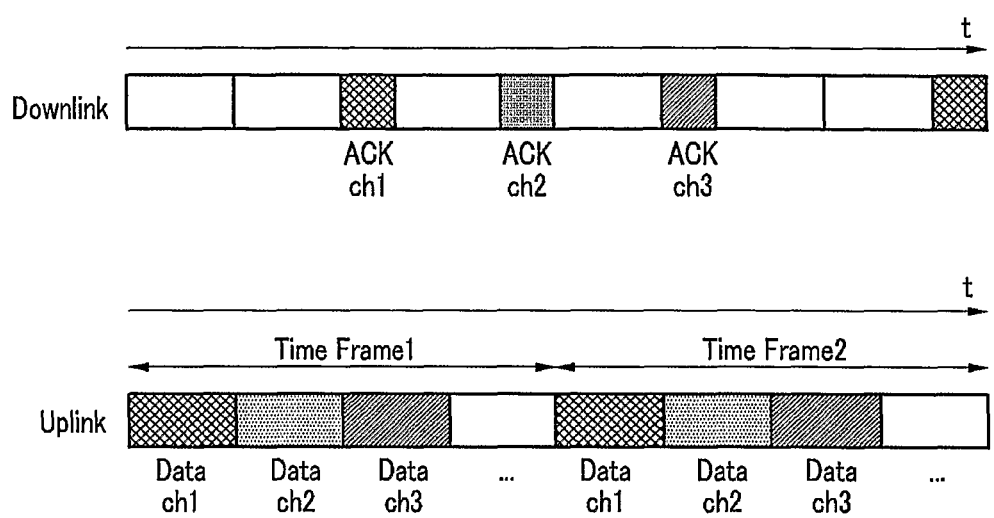
FIG. 2 shows an example of channel allocation in a down link and an uplink in a wireless communication system according to an exemplary embodiment of the present invention.

FIG. 2 shows an example of channel allocation in a downlink and an uplink in a wireless communication system according to an exemplary embodiment of the present invention.

Referring to FIG. 2, a reverse link has a plurality of data channels that are used by a plurality of transmitters to transmit data, and a forward link has response channels for the data that are transmitted through the reverse link.

An H-ARQ supporting method for cooperative transmission will now be described by referring to the above-described system structure and the communication paths with reference to drawings.

Also, a transmitter having generated information data to be transmitted will be called a transmitting node, and another transmitter for transmitting data in cooperation with the transmitting node will be called a relay node. Also, a transmitter group including the transmitting node and the relay node will be referred to as a cooperative group. The transmitting node will be exemplified as the first transmitter 110.

Figure 3:
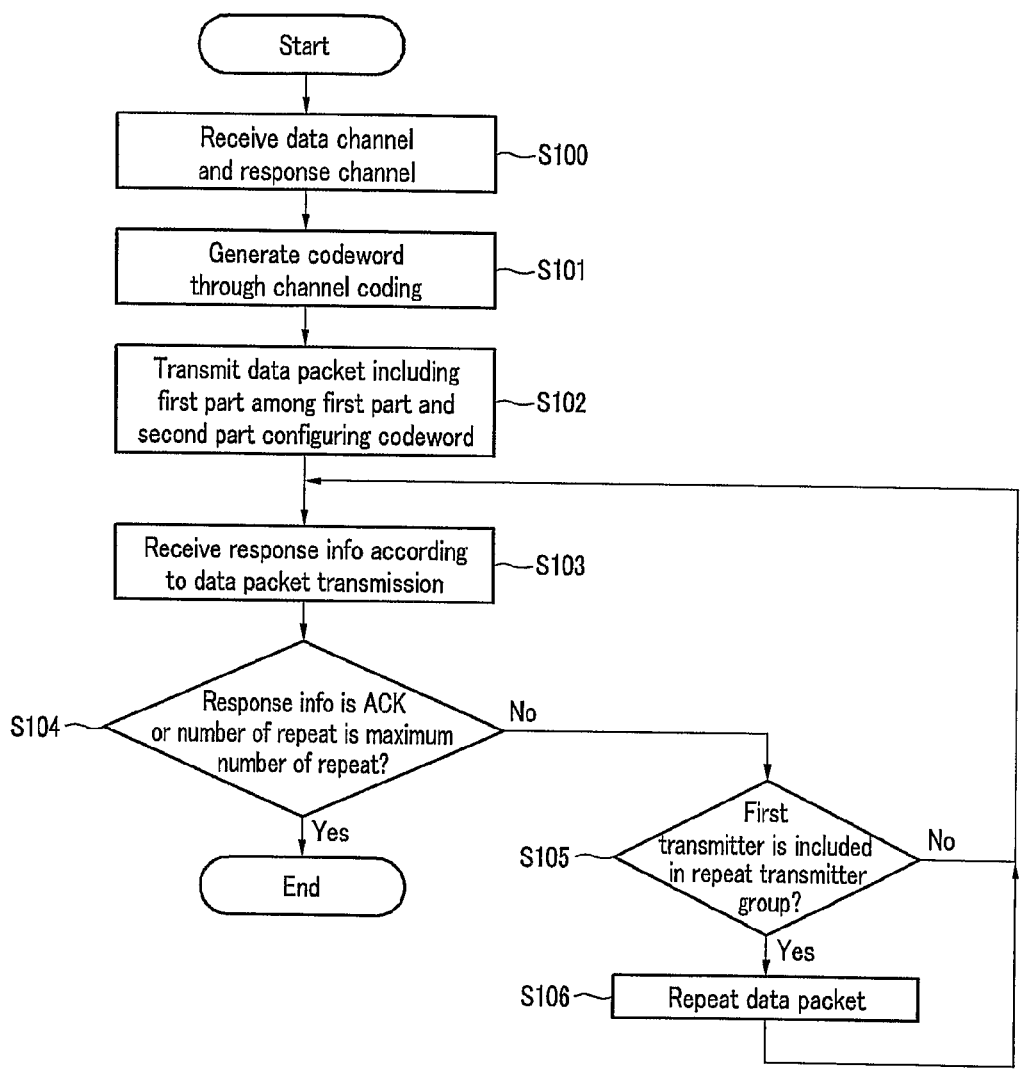
FIG. 3 is a flowchart for an H-ARQ supporting method of a transmitting node for a cooperative transmission method according to an exemplary embodiment of the present invention.

FIG. 3 is a flowchart for an H-ARQ supporting method of a transmitting node for a cooperative transmission method according to an exemplary embodiment of the present invention.

Referring to FIG. 3, when the data to be transmitted are generated, the first transmitter 110, which is a transmitting node, transmits a data transmission request, that is, a data channel and response channel allocation request, to the receiver 200, and receives a data channel and a response channel from the receiver 200 (S100). On receiving the data channel and response channel allocation request from the first transmitter 110, the receiver 200 selects M relay node transmitters to be included in the cooperative group of the first transmitter, and allocates the same data channel and response channel to the transmitters in the corresponding cooperative group.

On receiving the data channel and the response channel from the receiver 200, the first transmitter 110 performs a channel coding process on the K-length information data to generate an N-length codeword (S101). In this instance, the codeword generated through the channel coding process includes K-length information data and a parity bit. Also, the codeword is divided into an N1-length first part for data transmission and an N2-length second part, and the first part includes the information data while the second part includes the parity bit.

The first transmitter 110 transmits the data packet that includes the first part of the codeword that is generated through the allocated data channel to the receiver 200 and the transmitters 120, 130, and 140 that are relay nodes in the cooperative group 100 (S102).

Accordingly, the first transmitter 110 receives response information from the receiver 200 in correspondence to the data packet transmission (S103). In this instance, when the response information received from the receiver 200 is an ACK message (S104), that is, when the transmission is successful, the first transmitter 110 senses the success of data packet transmission and finishes transmission of the corresponding data packet.

When the response information corresponds to a re-transmission request caused by transmission failure, the first transmitter 110 retransmits the corresponding data packet according to response information (S105, S106). The first transmitter 110 iterates retransmitting the corresponding data packet until it receives an ACK from the receiver 200 or the number of data transmission repeats reaches the number of maximum repeat times ($r_{max}$) (S105, S106).

Here, the response information provided by the receiver 200 has various types, and the response information can indicate repeat request information according to a data packet transmission success state, a repeat transmitter for indicating the transmitter for transmitting the data, and repeat method information for indicating the method for repeat transmission of the data to the receiver 200. For this, the response information includes a repeat transmitter or identification information on the repeat method.

Regarding another method for configuring the response information, specific response information can be configured to indicate a specific repeat transmitter and repeat method, without including the repeat transmitter and identification information on the repeat method. For example, NACK1 can be configured to indicate the case in which the repeat transmitter is a second transmitter and the repeat method is the chase combining (CC) method, NACK2 can be configured to indicate the case in which the repeat transmitter is a second transmitter and the repeat method is the incremental redundancy (IR) method, and NACK3 can be configured to indicate the case in which the repeat transmitter is a first transmitter and the repeat method is the IR method.

Regarding another method for configuring the response information, the transmitter can be selected in advance to be shared with the receiver before transmitting the data packet, and the response information can be configured to indicate a transmission success state and a repeat method.

The receiver and the transmitters in the cooperative group 100 share configuration information of the response information through a predetermined rule so that the transmitter having received response information from the receiver can acquire the transmission success state and information on the repeat transmitter or the repeat method from the response information.

Accordingly, when the first transmitter 110 having received the response information analyzes the response information to find that the transmission has failed and the first transmitter 110 is selected to be a repeat transmitter, the first transmitter 110 retransmits the corresponding data packet by using the data repeat method indicated by the response information.

Figure 4:
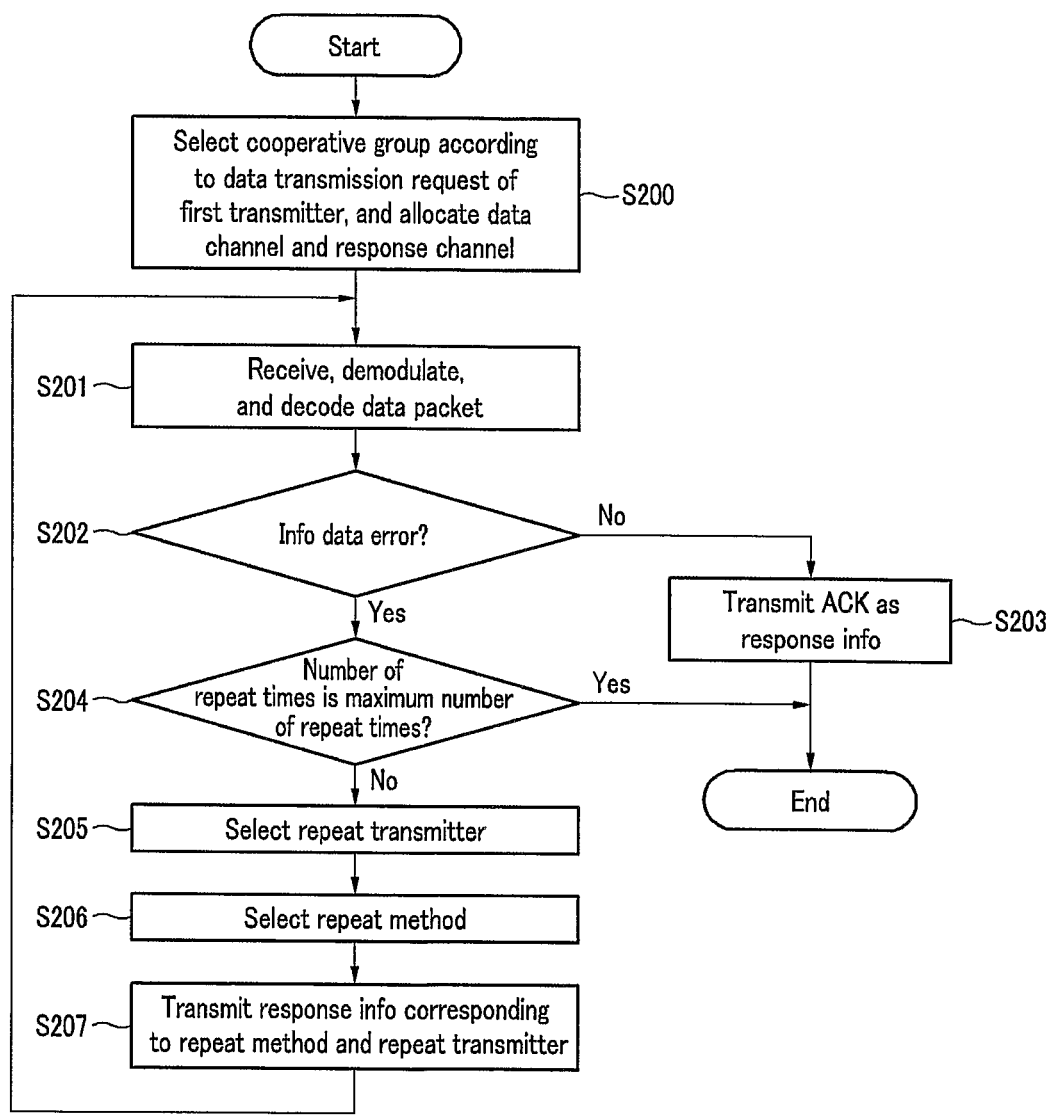
FIG. 4 is a flowchart for an H-ARQ supporting method of a receiver for a cooperative transmission method according to an exemplary embodiment of the present invention.

FIG. 4 is a flowchart for an H-ARQ supporting method of a receiver 200 for a cooperative transmission method according to an exemplary embodiment of the present invention.

Referring to FIG. 4, on receiving a data transmission request, which is a data channel and response channel allocation request, from the first transmitter 110, which is a transmitting node, the receiver 200 selects a cooperative group 100 including the first transmitter 110 for performing cooperative transmission with the first transmitter 110. When the cooperative group 100 is selected, the receiver 200 allocates a data channel and a response channel to be used by the corresponding cooperative group 100 (S200). In this instance, the method for allocating the data channel and the response channel to the transmitters 110, 120, 130, and 140 in the corresponding cooperative group 100 is known to a person of an ordinary skill in the art, and so no corresponding detailed description will be provided.

When the first transmitter 110 transmits the encoded data packet by using the allocated data channel, the receiver 200 demodulates and decodes the data packet (S201) to restore information data, and checks whether the restored information data have errors. In this instance, since the first part includes information data even when the first transmitter 110 performs channel coding to generate a codeword and transmits the data packet configured by the first part of the codeword, the receiver 200 can restore the information data through demodulation and decoding.

When the restored information data have no error (S202), the receiver 200 transmits an ACK message as response information to the transmitters in the cooperative group 100 by using the response channel allocated to the cooperative group 100 (S203). When the restored information data have an error (S202), the receiver 200 selects a repeat transmitter for repeat transmission of the data packet from the cooperative group 100 (S205), and selects one data repeat method (S206). The selected repeat transmitter and information on the repeat method are included in the response information together with a repeat request by the receiver 200 and are then transmitted to the cooperative group 100 (S207).

When data are retransmitted by the transmitter that is selected as a repeat transmitter in the cooperative group 100 according to the response information, the receiver 200 demodulates and decodes the data packet and repeats the response process (S201-S207) until the restored information data have no errors or the repeat number of the corresponding data packet reaches the number of the maximum repeat times ($r_{max}$) (S204).

Figure 5:
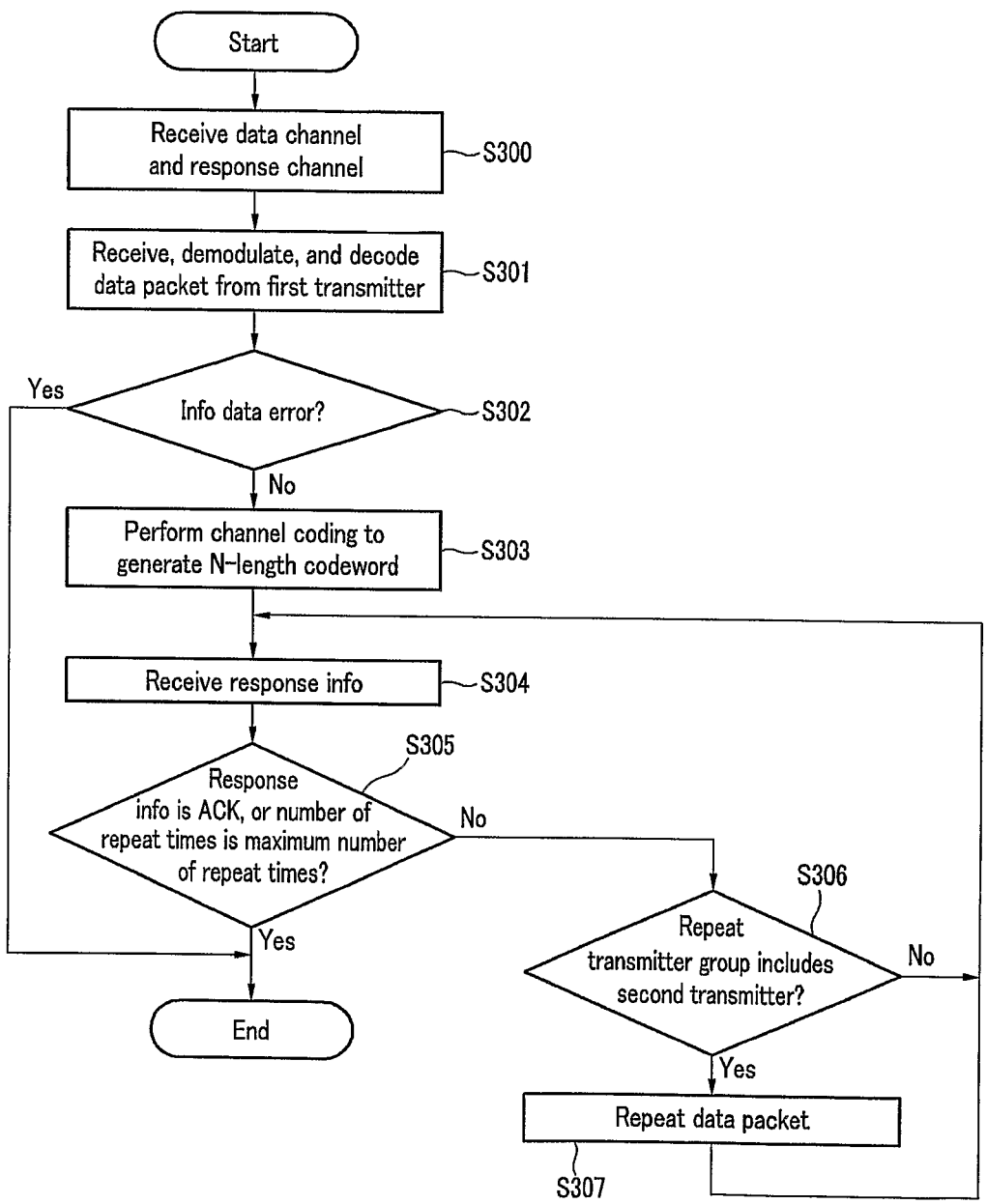
FIG. 5 is a flowchart for an H-ARQ supporting method of a relay node for a cooperative transmission method according to an exemplary embodiment of the present invention.

FIG. 5 is a flowchart for an H-ARQ supporting method of a relay node for a cooperative transmission method according to an exemplary embodiment of the present invention, illustrating a second transmitter 120 from among relay nodes in the cooperative group 100 shown in FIG. 1.

Referring to FIG. 5, when a data transmission request is generated from the first transmitter 110 that is a transmitting node and the receiver 200 includes the second transmitter 120 into the cooperative group 100 corresponding to data transmission by the first transmitter 110, the second transmitter 120 receives a data channel and a response channel corresponding to the cooperative group 100 from the receiver 200 (S300).

The second transmitter 120 receives an $N_1$-length data packet including information data from the first transmitter 110 through the allocated data channel, restores K-length information data through the demodulation and decoding process, and checks the errors of the information data (S301). When the restored information data have an error (S302), the second transmitter 120 stops the cooperation with the first transmitter 110. When the restored information data have no error (S302), the second transmitter 120 channel-encodes the restored information data to restore the entire N-length codeword encoded by the first transmitter 110 (S303). In this instance, the second transmitter performs the channel coding process by using the same method as that of the first transmitter, and the N-length codeword is usable in the H-ARQ method.

The second transmitter 120 receives response information on the data packet transmitted by the first transmitter 110 from the receiver 200 through the response channel (S304). When the response information corresponds to transmission failure (S305), the second transmitter 120 analyzes the response information so as to acquire information on the repeat method and repeat transmitter. When the repeat transmitter selecting information included in the response information includes the second transmitter 120 (S306), the second transmitter 120 retransmits the data packet by using the repeat method included in the response information (S307).

The second transmitter receives the response information corresponding to the data packet retransmitted by one of the transmitters in the cooperative group from the receiver 200, and repeats data packet retransmission corresponding to the response information until the response information is an ACK through the above-described response information analysis process (S304-S307) or the number of corresponding data packet repeat times equals the number of maximum repeat times ($r_{max}$).

A method for the receiver 200 to configure the response information and an operation by the transmitter having received the same in the H-ARQ supporting process for cooperative transmission according to an exemplary embodiment of the present invention will now be described.

A method for finding the received signal-to-noise ratio (SNR) that is used by the receiver 200 to determine a repeat transmitter group ($A_i$) will now be described.

In the flat block fading condition, the data packet received by the receiver 200 is expressed by Equation 1.

$$r_{1,l} = \alpha_1^{(1)} s_{1,l} + n_{1,l}$$
$$r_{i,l} = \left(\sum_{j \in A_i} \alpha_i^{(j)}\right) s_{i,l} + n_{i,l}, \ i \geq 2$$
[Equation 1]

Here, $A_i$ is a repeat transmitter group for repeating the data packet in the i-th time frame, and $r_{i,l}$, $s_{i,l}$, $n_{i,l}$ are a received symbol, a transmitted symbol, and background noise in the i-th symbol time of the i-th time frame. Further, transmission energy ($E_{s,i}$) of the transmitted symbol is $E(|n_{i,l}|^2) = N_0$, and $\alpha_i^{(j)}$ is a complex fading gain between the transmitter j and the receiver in the i-th frame. Accordingly, the received SNR of the symbols received from the transmitter j in the i-th frame is expressed as $$\gamma_i^{(j)} = \frac{|\alpha_i^{(j)}|^2 E_{s,i}}{N_0}.$$

However, the above-noted SNR is the received SNR received from one transmitter j. In order to find the received SNR ($\gamma_i$) for the received signal in the case of receiving the signal from a plurality of transmitters, the SNR for each transmitter is processed to diverseness combination for the received packet. A log-likelihood ratio for each information data bit is calculated, and the received SNR is estimated from the absolute value of the calculated log-likelihood ratio. The method for finding the SNR ($\gamma_i$) of the signals received from a plurality of transmitters is known to a person of an ordinary skill in the art and no corresponding detailed description will be provided.

Figure 6:
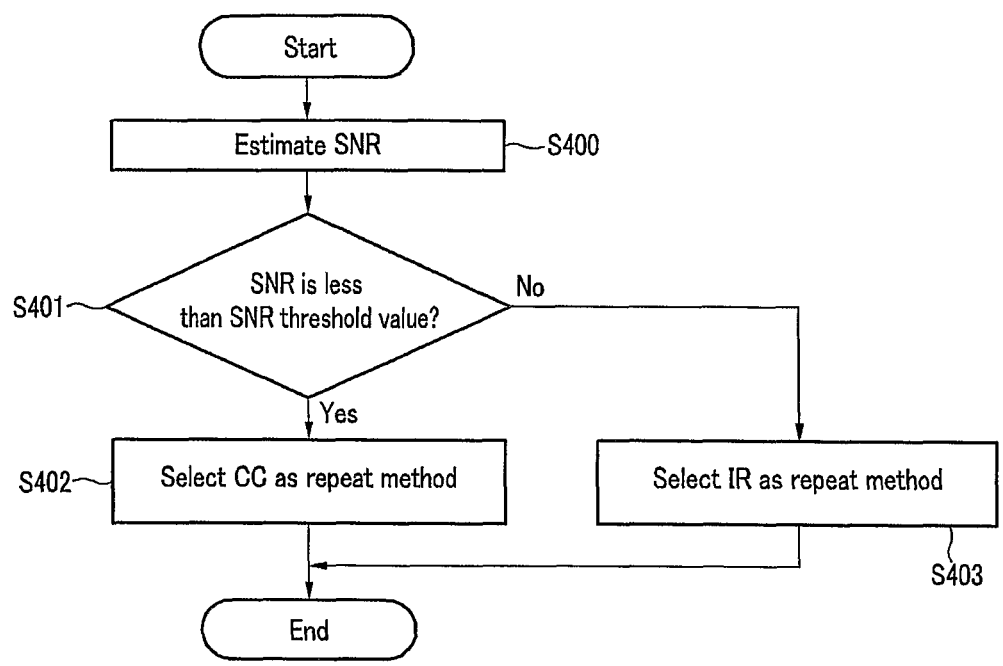
FIG. 6 shows a data packet according to an exemplary embodiment of the present invention.

In the exemplary embodiment of the present invention, the CC method and the IR method are used for the data packet repeat method, and it is required in this instance that the first part including data with a higher priority such as the information data must be positioned in advance to the second part having a bit with a lower priority such as the parity bit in the codeword during the channel coding process. When the codeword is configured as described above, the same data packet as the previously transmitted data packet is transmitted in the CC method, and the data packet is transmitted while gradually increasing the parity bit in the IR method. FIG. 6 shows a data packet according to an exemplary embodiment of the present invention.

Figure 7:
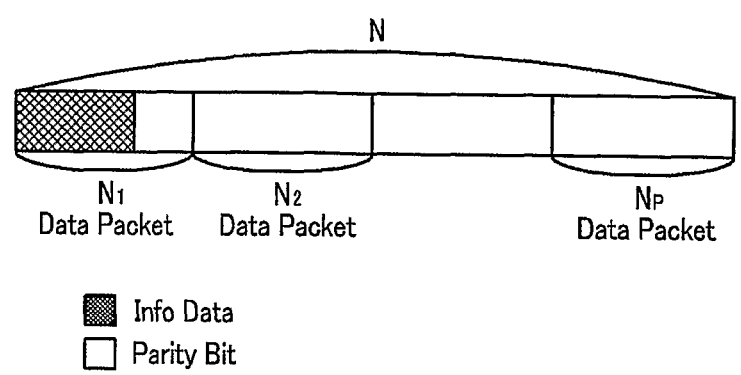
FIG. 7 is a flowchart for a receiver to select a repeat method when a transmission error is generated in the H-ARQ supporting method for cooperative transmission according to an exemplary embodiment of the present invention.

FIG. 7 is a flowchart for a receiver 200 to select a repeat method when a transmission error is generated in the H-ARQ supporting method for cooperative transmission according to an exemplary embodiment of the present invention.

Referring to FIG. 7, when a transmission error is generated, the receiver 200 estimates the received SNR ($\gamma_i$) for each time frame or for each predetermined time frame (S400). In this instance, the method for estimating the SNR is differently applied depending on the number of transmitters for transmitting the signals to the receiver. The receiver 200 selects the CC method as the repeat method (S402) when the estimated SNR ($\gamma_i$) is less than the SNR threshold value ($T_1$) (S401), and it selects the IR method as the repeat method (S403) when the SNR ($\gamma_i$) is greater than the SNR threshold value ($T_1$) (S401). The repeat method selected by the receiver 200 is applied to the response information.

The above-described method for selecting the repeat method according to the SNR ($\gamma_i$) will be referred to as an adaptive method, which increases the data rate caused by the H-ARQ operation and reduces the error rate by selecting the optimized repeat method according to the channel condition. The effect on the adaptive method will be described again later based on the experimental result.

When a transmission error occurs during the cooperative transmission, the receiver 200 selects the transmitter for repeat transmission of the erroneous data packet, which will now be described through three examples. When the receiver 200 shares configuration information on the response information through a predetermined rule with the cooperative group 100, the transmitters of the cooperative group 100 can sense the repeat transmitter and the repeat method selecting information included in the response information.

A first method for selecting the repeat transmitter is a method for the receiver 200 to select the cooperative group 100, predetermine a repeat transmitter for repeat transmission of a data packet when an error occurs, and notify the cooperative group 100 of the repeat transmitter, and thereby reduce the overhead of the response information.

In this case, when it is needed to retransmit the data packet because of erroneous data packet transmission, the receiver 200 and the cooperative group 100 set one of the transmitters in the cooperative group 100 to be a repeat transmitter, or set in advance all the transmitters in the cooperative group 100 as repeat transmitters. When the repeat transmitter is selected in advance as described, the overhead of response information can be reduced since there is no need to add response information so as to select the repeat transmitter when an error occurs while the data packet is transmitted. Also, when all the transmitters in the cooperative group are set to be repeat transmitters, the transmitters simultaneously transmit the same data to thus acquire diversity gain.

When the receiver 200 adaptively selects the repeat method while the repeat transmitter is predetermined, response information is needed to be added so as to notify the transmitter in the cooperative group 100 of the repeat method. For example, when the receiver 200 sets the first transmitter that is a transmitting node and the second transmitter that is a relay node to be a cooperative group and selects the repeat transmitter as the second transmitter in advance, the receiver selects the repeat method when the data packet transmission generates an error as described above. The receiver 200 transmits a NACK1 message when the selected repeat method is the CC method, and it transmits a NACK2 message when the selected repeat method is the IR method so that the second transmitter selected as the repeat transmitter may receive the message and retransmit the data packet by using the CC method or the IR method.

A second example for selecting the repeat transmitter is a method for preventing unneeded power consumption of the transmitting node by determining whether to include the transmitting node into the repeat transmitter group according to the SNR of the transmitting node.

In this case, when an error occurs during receiving the data packet, the SNR ($\gamma_i^{(1)}$) of the first transmitter that is the transmitting node is measured, and it is determined whether to remove the first transmitter from the repeat transmitter group ($A_i$) according to the measured SNR ($\gamma_i^{(1)}$) of the first transmitter. That is, when the SNR $\Gamma_1 = \gamma_i^{(1)}$ the first transmitter is less than the SNR threshold value ($T_1$), the first transmitter is removed from the repeat transmitter group ($A_i$). Otherwise, when the SNR $\Gamma_1 = \gamma_i^{(1)}$ the first transmitter is greater than the SNR threshold value ($T_1$), the first transmitter is included in the repeat transmitter group ($A_i$).

In this case, it can be determined whether to include the transmitters in the cooperative group other than the first transmitter that is the transmitting node into the repeat transmitter group, according to a previously selection by the receiver 200 and the cooperative group 100. For example, it is possible to select all the transmitters in the cooperative group 100 so that the transmitters may be included in the repeat transmitter group irrespective of the inclusion state of the first transmitter. In another case, it is possible to select all the transmitters in the cooperative group 100 except the first transmitter as repeat transmitters when the first transmitter is excluded from the repeat transmitter group, and it is possible to select the first transmitter as a repeat transmitter when the first transmitter is included in the repeat transmitter group. In this case, the receiver 200 has previously determined whether to include the transmitters other than the first transmitter that is a transmitting node in the cooperative group 100 into the repeat transmitter group, and hence, it is needed to additionally configure response information for indicating the inclusion state of the first transmitter into the repeat transmitter group when a repeat transmission is required.

As described above, the response information configuring method for determining whether to eliminate the transmitting node from the repeat transmitter group according to the SNR ($\gamma_i^{(1)}$) the transmitting node has an advantage of preventing undesired power consumption of the transmitting node by eliminating the transmitting node from the repeat transmitter group when the channel condition of the transmitting node is not good, and has less overhead of added response information.

In a like manner of the first method, the second method is required to additionally configure response information so as to select a repeat method and notify the cooperative group 100 of the selected repeat method.

A case in which the receiver 200 sets the first transmitter that is a transmitting node and the second transmitter that is a relay node to be a cooperative group will now be exemplified. It is assumed that the receiver and the cooperative group are previously selected so that the first transmitter is the repeat transmitter when the first transmitter is included in the repeat transmitter group, and the second transmitter is the repeat transmitter in the other case depending on the state whether the first transmitter is included in the repeat transmitter group.

In this case, the receiver 200 estimates the SNR ($\gamma_i^{(1)}$) of the first transmitter when an error occurs during data packet transmission. When the estimated SNR ($\gamma_i^{(1)}$) of the first transmitter is less than the SNR threshold value ($T_1$) i.e., ($\gamma_i^{(1)} < T_1$) the second transmitter is selected to be the repeat transmitter, and when the same is greater than the SNR threshold value ($T_1$) i.e., ($T_1 \leq \gamma_i^{(1)}$), the first transmitter is selected to be the repeat transmitter. Also, when the SNR ($\gamma_i$) of the received signal is less than the threshold value ($T_1$), the receiver 200 selects the repeat method according to the SNR ($\gamma_i$), and differently transmits response information according to the selected repeat method. That is, when $\gamma_i^{(1)} < T_1$ and $\gamma_i < T_1$, the second transmitter performs repeat transmission by using the CC method by transmitting the NACK1, and when $\gamma_i^{(1)} < T_1$ and $T_1 \leq \gamma_i$, the second transmitter performs repeat transmission by using the IR method by transmitting the NACK2. Also, when $T_1 \leq \gamma_i^{(1)}$, the first transmitter performs repeat transmission by using the IR method by transmitting the NACK3.

In the third method for selecting the repeat transmitter, undesired power consumption by the transmitters is prevented since the receiver 200 selects the transmitter having the best SNR ($\gamma_i^{(j)}$) in the cooperative group to be the repeat transmitter for each time frame or for a predetermined time frame.

That is, the receiver 200 estimates the SNR's ($\gamma_i^{(j)}$) of all the transmitters in the cooperative group 100 for each time frame, selects the transmitter $j^{opt}$ having the greatest SNR ($\gamma_i^{(j)}$) to be the repeat transmitter, and configures response information so that the transmitter $j^{opt}$ may perform repeat transmission.

In this instance, in order to transmit the selection of the transmitter $j^{opt}$ as a repeat transmitter to the cooperative group 100 through the response channel, the receiver 200 must include information on the selected repeat transmitter in the response information, and hence, it is needed to additionally configure the response information. Also, when repeat method selecting information is to be transmitted, it is needed to additionally configure response information so as to transmit the repeat method selecting information as well as the repeat transmitter selecting information to the transmitter, and hence, a large amount of response information is required compared to the first and second methods.

For example, the case in which the receiver 200 sets the first transmitter, which is a transmitting node, and the second transmitter, which is a relay node, as a cooperative group will now be described.

If the SNR's corresponding to the two transmitters are given as $\gamma_i^{(1)}$ and $\gamma_i^{(2)}$, the receiver 200 selects the transmitting node (the first transmitter) as a repeat transmitter when $\gamma_i^{(1)} > \gamma_i^{(2)}$ and selects the relay node (the second transmitter) when $\gamma_i^{(1)} \leq \gamma_i^{(2)}$. The receiver 200 controls the second transmitter to perform repeat transmission according to the CC method by transmitting the NACK1 when the repeat transmitter is the second transmitter and it is given that $\gamma_i^{(2)} < T_1$, and controls the second transmitter to perform repeat transmission according to the IR method by transmitting the NACK2 when the repeat transmitter is the second (2) transmitter and it is given that $T_1 \leq \gamma_i^{(2)}$, according to the above-described repeat method selecting information. When it is given that $\gamma_i^{(1)} > \gamma_i^{(2)}$, the receiver 200 transmits the NACK3 so that the first transmitter may perform repeat transmission through the IR method.

The method for selecting the transmitter $j_{opt}$ having the greatest SNR ($\gamma_i^{(j)}$) as a repeat transmitter by estimating the SNR ($\gamma_i^{(j)}$) of each transmitter for each time frame can prevent undesired power consumption of the transmitters since one of the transmitters in the cooperative group 100 performs repeat transmission.

Performance of the case in which repeat transmission is performed by the CC method or the IR method and performance of various conditions including the adaptive method for selecting the repeat method according to the exemplary embodiment of the present invention will now be compared, and the advantages of the adaptive method will be shown through the drawings and experimental results. The experimental results show the case in which the 3GPP2 cdma2000 1xEv-DO turbo codes are used as channel codes, the information data length is 402 bits, the modulation method is the BPSK method, and the code rate of the data packet transmitted in the first time frame is ½.

The experimental results in which the receiver 200 sets the first transmitter, which is a transmitting node, and the second transmitter, which is a relay node, to be a cooperative group, and the second transmitter is previously selected as the repeat transmitter will be described with reference to FIG. 8, FIG. 9, FIG. 10, and FIG. 11.

Figure 8:
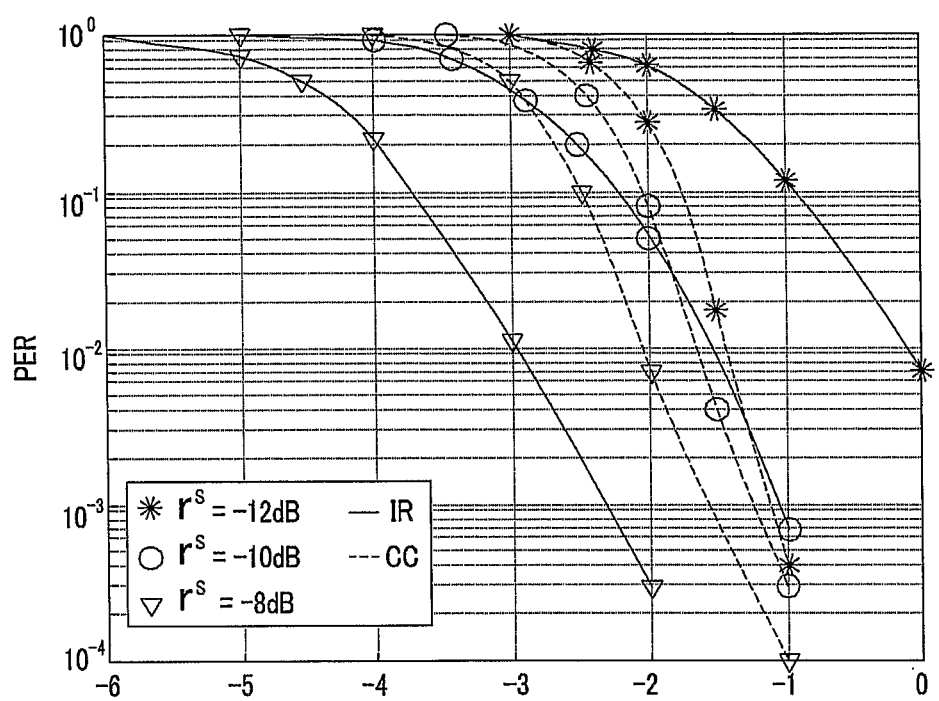
FIG. 8 shows a packet error rate following the H-ARQ method in a fading fixed channel.

FIG. 8 shows a packet error rate (PER) according to the CC method and the IR method in the AWGN condition that is a fading fixed channel. That is, FIG. 8 shows packet error rates for the case in which the second transmitter transmits a signal by using the CC method in the second time frame and the case in which the second transmitter transmits a signal by using the IR method with reference to the SNR $\Gamma^s = \gamma_1^{(1)}$ of the receiver 200 for the signal of the first transmitter and the SNR $\Gamma^r = \gamma_2^{(2)}$ for the signal of the second transmitter in the second time frame.

As shown in FIG. 8, when the SNR of the first transmitter is less than −10 dB, the case in which the second transmitter performs transmission by using the CC method in the second time frame generates better performance, and when the SNR of the first transmitter is greater than −10 dB, the case in which the second transmitter performs transmission by using the IR method in the second time frame generates better performance. Therefore, it is desirable to select the CC method (NACK1) when the threshold value $T_1$ is −10 dB and the SNR $\Gamma^s = \gamma_1^{(1)}$ of the first transmitter is less than the threshold value $T_1$, and to select the IR method (NACK2) when the same is greater than the threshold value $T_1$.

Figure 9:
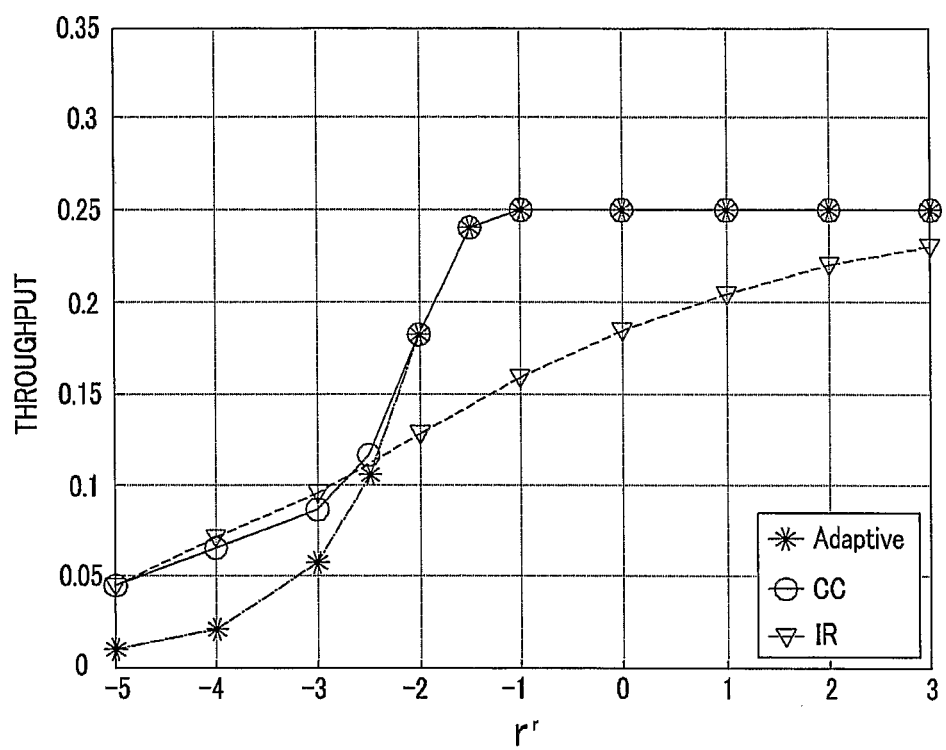
FIG. 9 shows data rates according to the repeat method when a repeat transmitter is selected in advance in a fading fixed channel.

FIG. 9 shows the data rates (which represent information bits that are transmitted without errors per frequency, bps/Hz) with respect to the SNR $\Gamma^r$ of the second transmitter when the repeat transmission is performed by using the CC method, the IR method, and the adaptive method according to the exemplary embodiment of the present invention. The channel between the first transmitter and the receiver has the block fading condition (fading undergone by one data packet is the same) in which the average SNR $E\{\Gamma^s\}$ is −10 dB, and the channel between the second transmitter and the receiver has the condition in which the SNR ($\Gamma^r$) is constant. In this instance, the maximum number of repeat times is set to be 2 including 1, that is, including the first transmission for the same information data block.

FIG. 9 shows the case in which the second transmitter performs transmission by respectively using the CC method and the IR method in the second transmission of 'CC' and 'IR', and 'Adaptive' shows the case in which the second transmitter selects the CC method (NACK1) when the SNR of the first transmitter $\Gamma^s$) is less than −10 dB and the second transmitter selects the IR method (NACK2) to perform repeat transmission when the SNR is greater than −10 dB as proposed in the exemplary embodiment of the present invention. Referring to FIG. 9, the method for selecting the repeat method according to the SNR provides the performance of the IR method when $\Gamma^s$ is low, and it provides the optimized performance as it generates the same performance as that of the CC method when $\Gamma^s$ is high.

Figure 10:
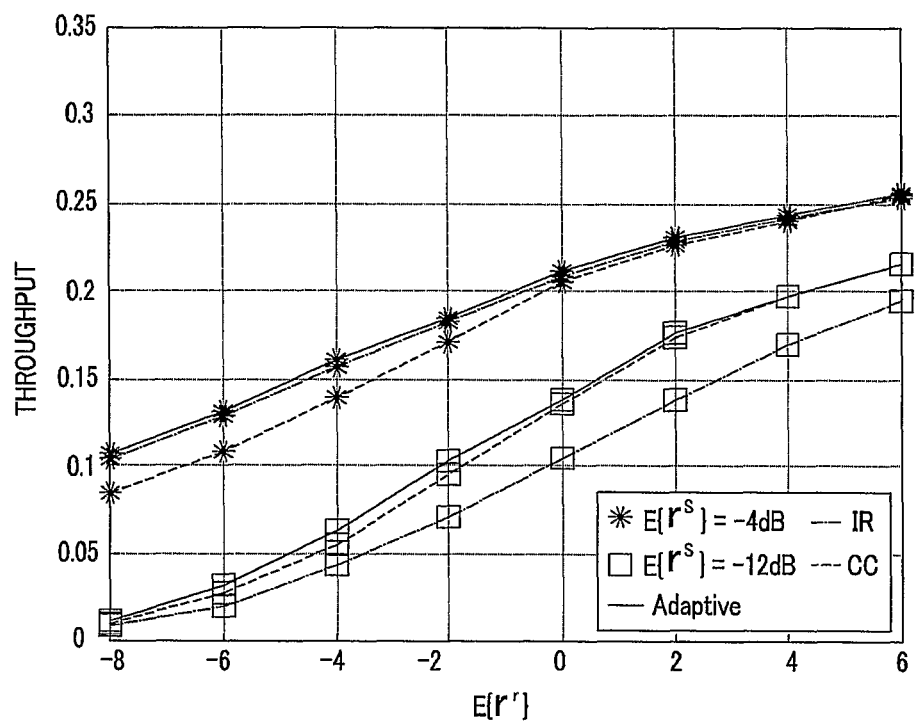
FIG. 10 shows average data rates of the repeat methods according to the SNR of the relay node when a channel between a transmitting node, a relay node, and a receiver is in the block fading condition and a repeat transmitter is selected in advance.
Figure 11:
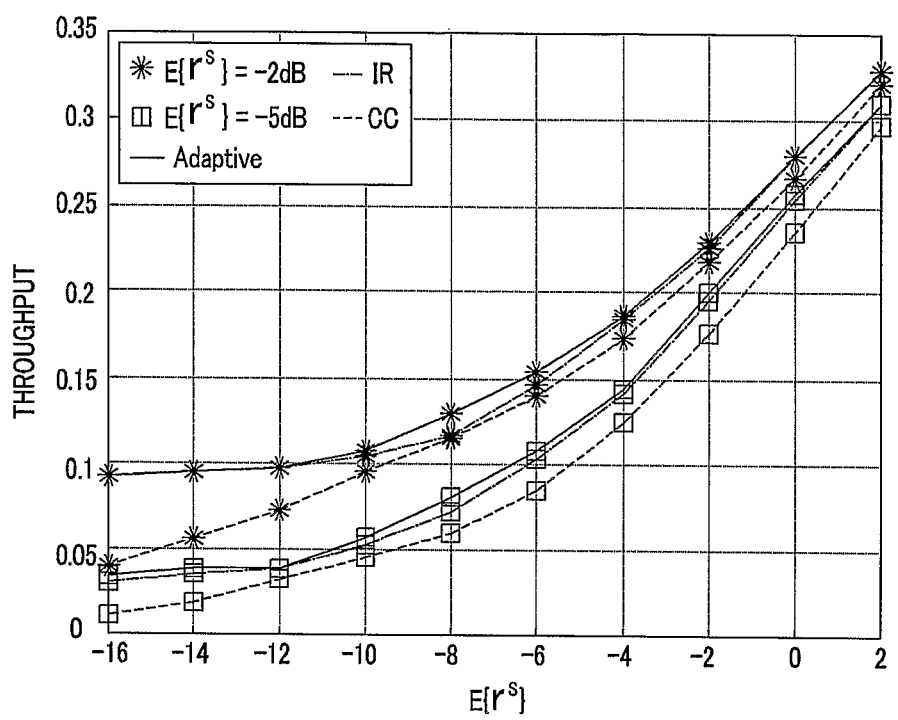
FIG. 11 shows average data rates of the repeat methods according to the SNR of the transmitting node when a channel between a transmitting node, a relay node, and a receiver is in the block fading condition and a repeat transmitter is selected in advance.

FIG. 10 and FIG. 11 respectively show the average data rates when repeat transmission is performed by using the CC method or the IR method, and the adaptive method. The channel between the first transmitter and the receiver and the channel between the second transmitter and the receiver are in the block fading condition. In this instance, FIG. 10 has the horizontal axis $E\{\Gamma^r\}$ and FIG. 11 has the horizontal axis $E\{\Gamma^s\}$. As shown in FIG. 10 and FIG. 11, when the average SNR $E\{\Gamma^s\}$ of the first transmitter is less, the adaptive method according to the exemplary embodiment of the present invention is particularly efficient in improving the data rate.

The experimental results of the case in which the receiver 200 sets the first transmitter that is a transmitting node and the second transmitter that is a relay node as a cooperative group and selects the repeat transmitter according to the received SNR will be described with reference to FIG. 12 and FIG. 13. In this instance, the method (NACK1) for the second transmitter to perform repeat transmission according to the CC method, the method (NACK2) for the second transmitter to perform repeat transmission according to the IR method, and the method (NACK3) for the first transmitter to perform repeat transmission according to the IR method can be selected depending on the response information of the receiver. Here, the maximum number of repeat times is limited to be 1.

Figure 12:
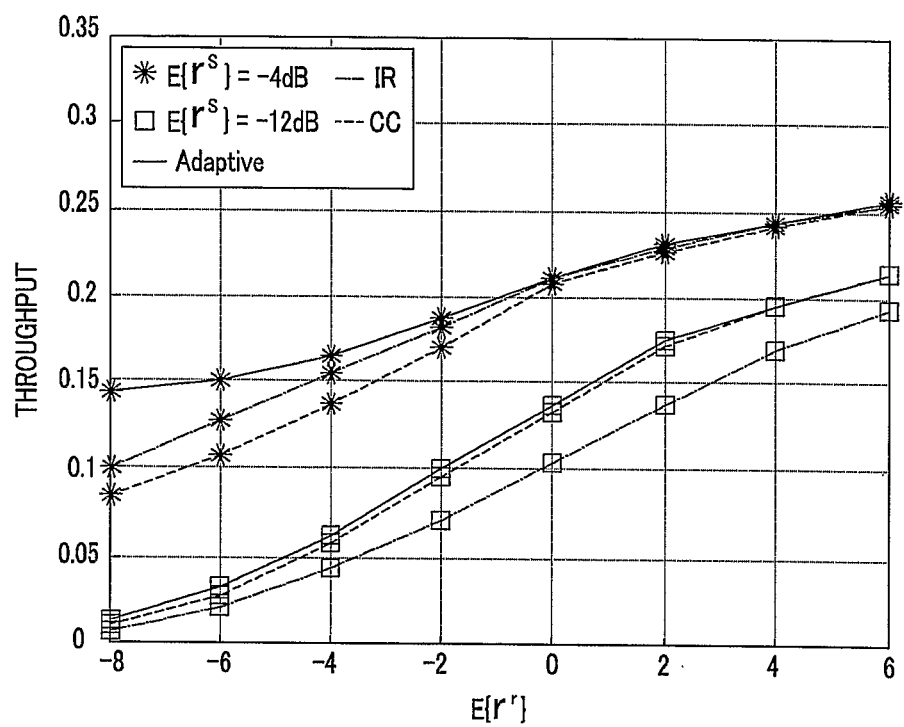
FIG. 12 shows average data rates of the repeat methods according to the SNR of the relay node when a channel between a transmitting node, a relay node, and a receiver is in the block fading condition and a repeat transmitter is selected adaptively.
Figure 13:
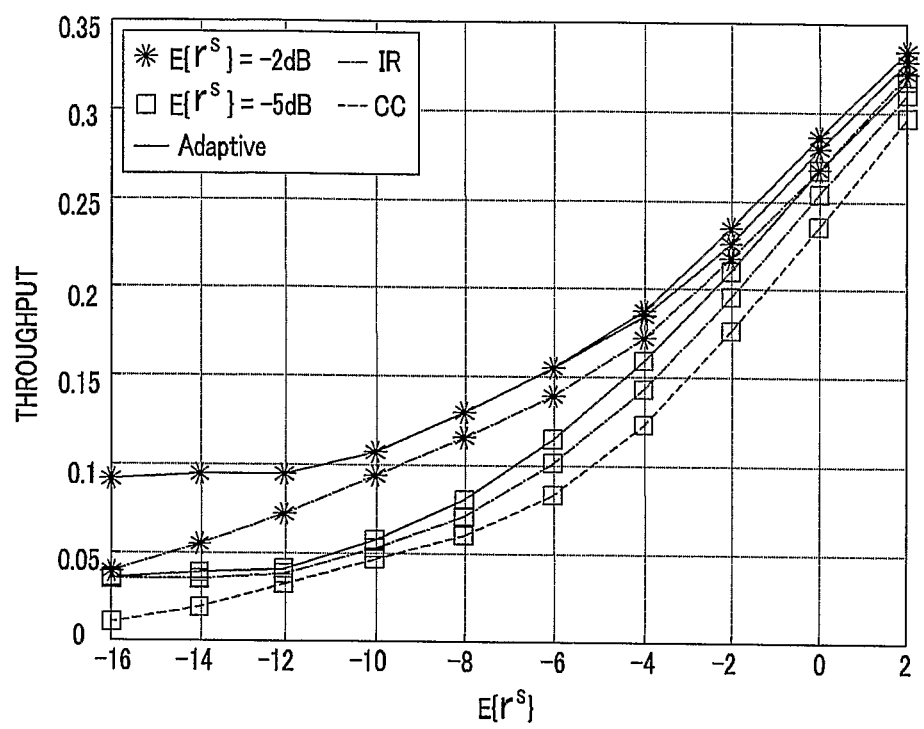
FIG. 13 shows average data rates of the repeat methods according to the SNR of the transmitting node when a channel between a transmitting node, a relay node, and a receiver is in the block fading condition and a repeat transmitter is selected adaptively.

In this instance, the channel between the first transmitter and the receiver and the channel between the second transmitter and the receiver are in the block fading condition, and FIG. 12 has the horizontal axis $E\{\Gamma^r\}$ and FIG. 13 has the horizontal axis $E\{\Gamma^s\}$.

Referring to FIG. 12, when the average received SNR between the first transmitter and the receiver is low, such as −12 dB, the CC method outperforms the IR method, and hence, the adaptive method according to the exemplary embodiment of the present invention generates the same performance as that of the method in which the second transmitter performs repeat transmission through the CC method and generates a similar performance to that of the adaptive method shown in FIG. 10.

The adaptive method used in FIG. 12 and FIG. 13 checks the SNR from the two transmitters to select a repeat transmitter from the two transmitters in the second time frame, and hence, the adaptive method outperforms the adaptive method in which the second transmitter performs repeat transmission in the area in which the average SNR of the first transmitter is greater than that of the second transmitter. Further, FIG. 13 shows greater data rates than FIG. 11 in the area in which the average SNR of the first transmitter is greater than that of the second transmitter.

However, although the method for selecting the repeat transmitter according to the SNR for each time generates excellent performance, it has a drawback that the receiver needs to acquire the SNR's of the two transmitters. Therefore, it is desirable for the system to select a desired exemplary embodiment according to channel state information available by the receiver.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, the improved H-ARQ supporting method for at least two transmitters to cooperatively transmit information data is provided. Also, the data rate is improved and the optimized H-ARQ performance is provided by selecting the CC method or the IR method from among the H-ARQ methods by using the SNR.

When the data packet transmission generates an error and thus requires repeat transmission, various methods for selecting a repeat transmitter from among a plurality of transmitters included in the cooperative group are provided. The first method selects a repeat transmitter in advance to thus reduce the overhead of response information, and acquires a diversity gain when all the transmitters in the cooperative group are selected as repeat transmitters. The second method removes the transmitting node from the repeat transmitter group when the SNR of the transmitting node is low, thereby preventing undesired power consumption of the transmitting node. The third method selects the transmitter with the greatest SNR as the repeat transmitter by estimating the SNR's of all the transmitters in the cooperative group, thereby preventing undesired power consumption by other transmitters.

The H-ARQ supporting method according to the exemplary embodiment of the present invention proposes various schemes for selecting the repeat transmitter and the repeat method to thereby allow selection of the optimized H-ARQ supporting method depending on the system condition.

What is claimed is:

1. A hybrid automatic repeat request (H-ARQ) supporting method by a relay node when a transmitting node transmits information data to a receiver in cooperation with at least one relay node, the method comprising:

receiving a first data packet corresponding to the information data from the transmitting node;

restoring the information data from the first data packet, and determining an erroneous state of the restored information data;

receiving response information from the receiver when the restored information data have no error; and transmitting a second data packet corresponding to the information data to the receiver when the response information includes a repeat request caused by transmission failure and repeat transmitter selecting information included in the response information indicates that the relay node is one of a plurality of repeat transmitters in a repeat transmitter group of the repeat transmitter selecting information, wherein the receiver transmits the response information to the relay node in response to the first data packet received directly from the transmitting node, wherein a repeat method is determined from the repeat transmitter selecting information and wherein the relay node transmits the second data packet corresponding to the information data to the receiver using the repeat method.

2. The method of claim 1, wherein the method further includes:

being allocated a data channel and a response channel by the receiver, wherein the data channel and the response channel is the same channel allocated to the transmission node, and wherein the first data packet and the second data packet are received and transmitted through the data channel and the response information is received through the response channel.

3. The method of claim 1, wherein the first data packet is part of a first codeword that is generated by channel coding the information data from the transmitting node, and is positioned forepart of the first codeword, wherein the forepart includes the information data.

4. The method of claim 3, wherein the method further includes:

generating a second codeword by channel coding the information data when the restored information data have no error, and wherein the second codeword is identical to the first codeword.

5. The method of claim 1, wherein the response information corresponds to the H-ARQ supporting method selected by the receiver, and the second data packet is differently generated according to the H-ARQ supporting method.

6. The method of claim 5, wherein the H-ARQ supporting method is selected from among the chase combining method and the incremental redundancy method, and the second data packet corresponds to the first data packet when the H-ARQ supporting method is the chase combining method.

* * * * *